US010947405B2

(12) United States Patent
Loccufier et al.

(10) Patent No.: US 10,947,405 B2
(45) Date of Patent: Mar. 16, 2021

(54) CAPSULES STABILISED BY CATIONIC DISPERSING GROUPS

(71) Applicant: AGFA NV, Mortsel (BE)

(72) Inventors: Johan Loccufier, Mortsel (BE); Luc Decoster, Mortsel (BE)

(73) Assignee: AGFA NV, Mortsel (BE)

( * ) Notice: Subject to any disclaimer, the term of this patent is extended or adjusted under 35 U.S.C. 154(b) by 0 days.

(21) Appl. No.: 16/479,992

(22) PCT Filed: Jan. 23, 2018

(86) PCT No.: PCT/EP2018/051515
§ 371 (c)(1),
(2) Date: Jul. 23, 2019

(87) PCT Pub. No.: WO2018/138069
PCT Pub. Date: Aug. 2, 2018

(65) Prior Publication Data
US 2019/0367761 A1 Dec. 5, 2019

(30) Foreign Application Priority Data

Jan. 24, 2017 (EP) .................................... 17152869

(51) Int. Cl.
| | | |
|---|---|---|
| *C09D 11/54* | (2014.01) | |
| *C09D 11/033* | (2014.01) | |
| *B41M 5/00* | (2006.01) | |
| *B01J 13/16* | (2006.01) | |
| *B41M 7/00* | (2006.01) | |
| *C09D 11/037* | (2014.01) | |
| *C09D 11/102* | (2014.01) | |
| *C09D 11/322* | (2014.01) | |
| *C09D 11/38* | (2014.01) | |
| *D06P 5/00* | (2006.01) | |
| *D06P 5/30* | (2006.01) | |
| *D06P 3/60* | (2006.01) | |

(52) U.S. Cl.
CPC .............. *C09D 11/54* (2013.01); *B01J 13/16* (2013.01); *B41M 5/0017* (2013.01); *B41M 5/0047* (2013.01); *B41M 7/009* (2013.01); *C09D 11/033* (2013.01); *C09D 11/037* (2013.01); *C09D 11/102* (2013.01); *C09D 11/322* (2013.01); *C09D 11/38* (2013.01); *D06P 5/002* (2013.01); *D06P 5/30* (2013.01); *D06P 3/60* (2013.01)

(58) Field of Classification Search
CPC ..... C09D 11/54; C09D 11/033; C09D 11/037; C09D 11/322; C09D 11/40; B41M 5/0023; B41M 5/0047; B41M 7/009; B01J 13/16
See application file for complete search history.

(56) References Cited

U.S. PATENT DOCUMENTS

| | | | |
|---|---|---|---|
| 5,853,861 A | 12/1998 | Held | |
| 7,582,698 B2 * | 9/2009 | Lubnin | C08G 18/0823 428/423.1 |
| 2006/0093761 A1 | 5/2006 | Chen | |
| 2009/0079790 A1 | 3/2009 | Mizutani | |
| 2009/0226678 A1 | 9/2009 | Yatake et al. | |
| 2010/0080911 A1 | 4/2010 | Okada | |
| 2012/0306976 A1 | 12/2012 | Kitagawa et al. | |
| 2014/0186533 A1 | 7/2014 | Kitagawa et al. | |
| 2016/0177112 A1 | 6/2016 | Sakaguchi et al. | |

FOREIGN PATENT DOCUMENTS

| | | |
|---|---|---|
| EP | 2 933 374 A1 | 10/2015 |
| WO | 01/94001 A2 | 12/2001 |
| WO | 03/029362 A2 | 4/2003 |
| WO | 2004/098767 A1 | 11/2004 |
| WO | 2005/083017 A1 | 9/2005 |
| WO | 2006/000384 A1 | 1/2006 |
| WO | 2007/063001 A1 | 6/2007 |
| WO | 2009/137753 A1 | 11/2009 |
| WO | 2012/075293 A2 | 6/2012 |
| WO | 2014/039306 A1 | 3/2014 |
| WO | 2014/130204 A1 | 8/2014 |
| WO | 2015/158592 A1 | 10/2015 |
| WO | 2015/158649 A1 | 10/2015 |
| WO | 2015/158654 A1 | 10/2015 |
| WO | 2016/165970 A1 | 10/2016 |

OTHER PUBLICATIONS

Official Communication issued in International Patent Application No. PCT/EP2018/051515, dated Apr. 9, 2018.

\* cited by examiner

*Primary Examiner* — Jason S Uhlenhake
(74) *Attorney, Agent, or Firm* — Stinson LLP

(57) ABSTRACT

An aqueous dispersion of a capsule is composed of a polymeric shell surrounding a core, the core includes one or more chemical reactants capable of forming a reaction product upon application of heat and/or radiation and the shell is stabilized by cationic dispersing groups.

8 Claims, No Drawings

CAPSULES STABILISED BY CATIONIC DISPERSING GROUPS

CROSS REFERENCE TO RELATED APPLICATIONS

This application is a 371 National Stage Application of PCT/EP2018/051515, filed Jan. 23, 2018. This application claims the benefit of European Application No. 17152869.8, filed Jan. 24, 2017, which is incorporated by reference herein in its entirety.

BACKGROUND OF THE INVENTION

1. Field of the Invention

The present invention relates to aqueous dispersions of capsules, such as microcapsules or nanocapsules for use in digital printing.

2. Description of the Related Art

Over the last years, offset and flexographic printing systems are being increasingly replaced by industrial inkjet printing systems due to their flexibility in use, e.g. variable data printing, and due to their enhanced reliability allowing their incorporation into production lines.

Radiation curable inkjet inks have been the preferred choice of ink for reasons of reliability and because high quality images can be printed on non-absorbing ink-receivers. However for economical and ecological reasons, it is desirable to be able to print aqueous resin based inks in a reliable way on these industrial inkjet printing systems.

It has also been observed that the required physical properties of the printed image such as adhesion performance, scratch resistance, solvent resistance, water fastness and flexibility, are much more difficult to obtain by means of aqueous inks compared to reactive inks.

To improve the physical properties of printed images obtained with aqueous inks, polymeric resins are added to the ink formulation. The use of water soluble resins in the aqueous inks has very often a detrimental impact on jetting reliability and on the latency of the ink jet head in the printer. These aspects are particularly important in an industrial environment where down time and complex maintenance cycles have to be avoided.

In order to achieve the combination of ink jet inks exhibiting good physical properties on a wide range of substrates, while exhibiting reliability of digital printing equipment for industrial printing, several concepts have been proposed. One of these concepts is to incorporate reactive chemistry such as monomers, crosslinkers, oligomers, polymeric resins into self-dispersible capsules. The chemical reactants in the core of the capsules are able to form a reaction product upon application of heat and/or light: WO2015/158649, WO2016/165970 and WO2015/158592. The disclosed capsules are all stabilised by anionic dispersing groups which are covalently coupled to the shell polymers of the capsule.

Capsules stabilised by anionic dispersing groups have the disadvantage that they are not compatible with pigments of inks which have a cationic charged surface or initial cationic charged surface such as inorganic pigments (Al-oxides, $TiO_2$, $Fe_2O_3$, . . . ) in the same aqueous formulation. Capsules stabilised by anionic dispersing groups have further the disadvantage that they show little to no affinity towards substrates with negatively charged surfaces such as glass, textile fibres (cellulose, viscose, . . . ), untreated paper and cardboard. This little to no affinity of the capsules to the substrate leads to a poor adhesion of the capsules after the curing or thermal activation step.

A rapidly evolving technology is digital textile printing, where there is a clear evolution from classical textile printing technologies such as screen printing towards digital printing. Additionally, there is a tendency to go from dye based inks to pigment based inks. Pigment based inks hold the promise of being compatible with different fibres, both natural fibres such as cellulose base fibres e.g. in cotton and synthetic fibres such as polyester and polyamide. Pigment based inks have the advantage of providing images with a higher light fastness than dye based inks. To bind the pigments to the different types of fibres preferably reactive binder technology has to be introduced into the inks. Several approaches have been disclosed in the patent literature.

WO2003/029362 discloses an ink composition comprising at least one pigment, at least one dispersed resin selected from the group consisting of acrylic acrylonitrile resins, styrene-acrylic resins, acrylic-butadiene resins, butadiene acrylonitrile resins and polyurethane resins, at least one crosslinker and a liquid medium. Melamine resins are disclosed particularly preferred resins.

WO2005/083017 discloses an ink for textile printing comprising specific wetting agents for spreading control. The inks comprise a polyurethane as pigment dispersing agent in combination with a melamine as fixing agent.

WO2009/137753 discloses an ink composition comprising a colorant, a specific crosslinked polyurethane designed for hydrolytical stability and a post curing agent selected from the group consisting of amide and amine formaldehyde resins, phenolic resins, urea resins and blocked isocyanates, with melamine formaldehyde resins as preferred embodiment.

U.S. Pat. No. 5,853,861 discloses an ink textile combination, where the ink comprises at least on pigment and a polymer having a functional group selected from an acid, a base, an epoxy and a hydroxyl group and where the textile comprises at least one specific functional group selected from the group consisting of a hydroxyl, an amine, an amide and a carbonyl moiety and a crosslinker selected from specific organometallic compounds and isocyanates.

US2009/0226678 discloses an ink set comprising a fixing liquid and an ink comprising a pigment dispersion. The fixing agent comprises specific polymer particles with a Tg below $-10°$ C. and a reactant, preferably a blocked isocyanate dispersion.

US2012/0306976 discloses an ink comprising a pigment, a dispersing agent for said pigment, typically an acrylate based resin, a water soluble fixing agent, typically a water soluble polymer such as a poly(vinyl alcohol) derivative or a polyurethane based resin and a crosslinking agent, preferably a blocked isocyanate, where said crosslinker is capable of crosslinking said dispersant and said polymer fixing agent upon thermal treatment at a temperature of at least $100°$ C.

EP 2933374 discloses the use of encapsulated reactive chemistry to manufacture printed textiles. Blocked isocyanates are disclosed as preferred reactive chemistry.

Most of the fabrics have a porous nature. When printing with pigment inks onto different fabrics, pigments penetrate deeper into the fabric resulting in a loss of gamut. Similar problem are known when printing on paper based substrates. To solve these problems, several approaches have been disclosed in the patent literature, where optimizers are jetted first onto a paper substrate, followed by jetting aqueous dye or pigment inks, resulting in an optimized image quality: US 2006093761, US 2009079790, US 2010080911.

Most of the fabric pre-treatments are done off line using a spray or padding approach, pre-treating the fabric as a whole independent of the image content, resulting in a higher chemistry consumption then strictly needed. Therefore, a digital approach, applying the optimizer chemistry according to the image content of the printed image is highly preferable. In textile printing, some approaches have been disclosed to print an optimizer fluid onto the fabric: US 2016177112. However, none of these approaches include reactive binding chemistry which is needed to fulfil the high functional demands on crock, chemical resistance and wash fastness often encountered in textile applications, requiring maximum adhesion to the fibres.

Reactive pre-treatments using classical padding or spraying approaches have been disclosed in WO200600384 and U520140186533. These approaches again used much more chemistry then required for the application.

It would be highly desirable to design formulations containing capsules containing reactive chemistry which are, within the same aqueous formulation, compatible with pigments showing positive charges at their surface, showing a high affinity to surfaces carrying negative charges and which can achieve a maximum adhesion to textile fibres or serve as a pre-treatment to increase the gamut of the printed image on different fabrics to match the required image quality.

SUMMARY OF THE INVENTION

Preferred embodiments of the present invention provide a solution to the above stated problems by providing a dispersion of capsules which are stabilised by means of cationic charged dispersing groups as defined below.

According to another aspect, the present invention includes a formulation of a pre-treatment liquid for treating textile fabrics before jetting coloured ink jet inks to obtain a printed image as defined below.

According to another aspect, the present invention includes a formulation of an aqueous inkjet ink as defined below.

It is another embodiment of the invention to provide an inkjet recording method as defined below.

It is another embodiment of the invention to provide a method of preparing cationic capsules as defined below.

Other features, elements, steps, characteristics and advantages of the present invention will become more apparent from the following detailed description of preferred embodiments of the present invention. Specific embodiments of the invention are also defined in the dependent claims.

DETAILED DESCRIPTION OF THE PREFERRED EMBODIMENTS

A. Nanocapsules
A.1. Method of Preparation

The preparation method of the capsules of the invention, hereafter called nanocapsule due to their small particle size, is preferably via a polymerization method which allows the highest control in designing the capsules. More preferably interfacial polymerization is used to prepare the capsules used in the invention. This technique is well-known and has recently been reviewed by Zhang Y. and Rochefort D. (Journal of Microencapsulation, 29(7), 636-649 (2012) and by Salitin (in Encapsulation Nanotechnologies, Vikas Mittal (ed.), chapter 5, 137-173 (Scrivener Publishing LLC (2013)).

Interfacial polymerisation is a particularly preferred technology for the preparation of capsules according to the present invention. In interfacial polymerization, such as interfacial polycondensation, two reactants meet at the interface of the emulsion droplets and react rapidly.

In general, interfacial polymerisation requires the dispersion of an oleophilic phase in an aqueous continuous phase or vice versa. Each of the phases contains at least one dissolved monomer (a first shell component in e.g. the oleophilic phase) that is capable of reacting with another monomer (a second shell component) dissolved in the other phase, e.g. the aqueous phase. Upon polymerisation, a polymer is formed that is insoluble in both the aqueous and the oleophilic phase. As a result, the formed polymer has a tendency to precipitate at the interface of the oleophilic and aqueous phase, hereby forming a shell around the dispersed phase, which grows upon further polymerisation. The capsules according to the present invention are preferably prepared from an oleophilic dispersion in an aqueous continuous phase.

A.2. Polymeric Shell

Typical polymeric shells, formed by interfacial polymerisation are selected from the group consisting of polyamides, typically prepared from di- or poly-acid chlorides as first shell component and di- or oligoamines as second shell component, polyurea, typically prepared from di- or oligoisocyanates as first shell component and di- or oligoamines as second shell component, polyurethanes, typically prepared from di- or oligoisocyanates as first shell component and di- or oligoalcohols as second shell component, polysulfonamides, typically prepared from di- or oligosulfochlorides as first shell component and di- or oligoamines as second shell component, polyesters, typically prepared from di- or oligoacid chlorides as first shell component and di- or oligoalcohols as second shell component and polycarbonates, typically prepared from di- or oligo-chloroformates as first shell component and di- or oligoalcohols as second shell component. The shell can be composed of combinations of these polymers.

In a further embodiment, polymers, such as gelatine, chitosan, albumin and polyethylene imine can be used as second shell components in combination with a di- or oligio-isocyanate, a di- or oligo acid chloride, a di- or oligo-chloroformate and a epoxy resin as first shell component.

In a particularly preferred embodiment, the shell is composed of a polyurethane, a polyurea or a combination thereof. In a further preferred embodiment, a water immiscible solvent is used in the dispersion step, which is removed by solvent stripping before or after the shell formation. In a particularly preferred embodiment, the water immiscible solvent has a boiling point below 100° C. at normal pressure. Esters are particularly preferred as water immiscible solvent.

In a further preferred embodiment, said nanocaps is a selfdispersing cationic nanocaps. A selfdispersing nanocap is defined as a nanocapsule where the cationic dispersing groups responsible for colloid stability are covalently coupled to the shell.

The cationic dispersing groups which make part of the shell of the nanocapsule of the invention are preferably selected from protonated amines, protonated nitrogen containing heteroarmoatic compounds, quaternized tertiary amines, N-quaternized heteroaromatic compounds, sulfoniums and phosphoniums, quaternized tertiary amines and N-quaternized heteroaromatic compounds being more preferred. In a further preferred embodiment, the cationic dispersing group is a quaternary ammonium group, a tetraalkyl ammonium group being particularly preferred. In a more preferred embodiment the quaternary ammonium group is covalently coupled to the shell of the nanocapsules according to the present invention. In a particularly preferred embodiment the cationic dispersing group is covalently coupled to the shell of the nanocapsules according to the present invention by reaction of a surfactant comprising at least one primary or secondary amine group and at least one quaternary ammonium group with a compound selected from the group of di- or poly-acid chlorides, di- or oligoisocyanates, di- or oligosulfochlorides, di- or oligo-chloroformates and an isocyanate monomer of the shell. More preferably the surfactant comprising at least one primary or secondary amine group and at least one quaternary ammonium group reacts with an isocyanate monomer of the shell. The surfactant is characterised in that the hydrophilic group comprises the at least one primary or secondary amine group and the at least one quaternary ammonium group. The hydrophobic group of the surfactant may be any hydrophobic group, but is preferably a substituted or unsubstituted alkyl group, a substituted or unsubstituted alkenyl group or a substituted or unsubstituted alkynyl group, all having at least eight carbon atoms. The advantage of using a surfactant to obtain a shell comprising cationic dispersing groups, is that the emulsifying function of the surfactant can stabilize the oleophilic phase in the continuous aqueous phase during the preparation of the capsule. (see 3$^{rd}$ paragraph of § A.1.)

In an even more preferred embodiment said surfactant is a surfactant according to General Formula I Formula I

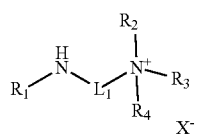

wherein
$R_1$ is selected from the group consisting of a substituted or unsubstituted alkyl group, a substituted or unsubstituted alkenyl group and a substituted or unsubstituted alkynyl group with the proviso that $R_1$ comprises at least eight carbon atoms; $R_2$, $R_3$ and $R_4$ are independently selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted (hetero)aryl group
$L_1$ represents a divalent linking group comprising no more than eight carbon atoms;
X represents a counterion to compensate the positive charge of the ammonium group.

Surfactants according to General Formula II are particularly preferred.

General Formula II

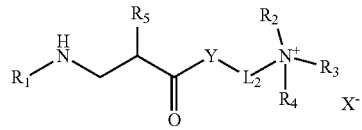

wherein
$R_1$, $R_2$, $R_3$, $R_4$ an X are defined as in general formula I $R_5$ represents a hydrogen or a methyl group
Y is selected from the group consisting of an oxygen atom and $NR_6$ $R_6$ is selected from the group consisting of a hydrogen and a substituted or unsubstituted alkyl group
$L_2$ represents a substituted or unsubstituted alkylene group.

In a more preferred embodiment, $R_1$ comprises at least ten carbon atoms and most preferably at least twelve carbon atoms. In a further preferred embodiment $R_2$, $R_3$ and $R_4$ independently represent a lower alkyl group, a methyl and an ethyl group being particularly preferred. In another preferred embodiment Y represents NH.

Specific examples of surfactants according to General Formula I and General Formula II are given below without being limited thereto.

TABLE 1

| | |
|---|---|
| 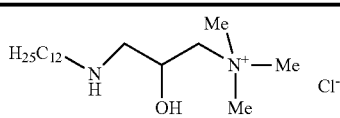 | Surf-1 |
| 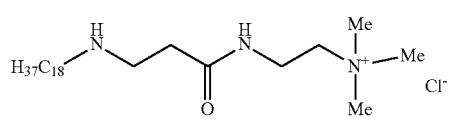 | Surf-2 |
| 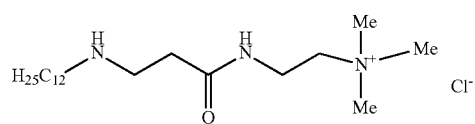 | Surf-3 |
| 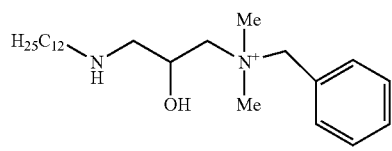 | Surf-4 |

TABLE 1-continued

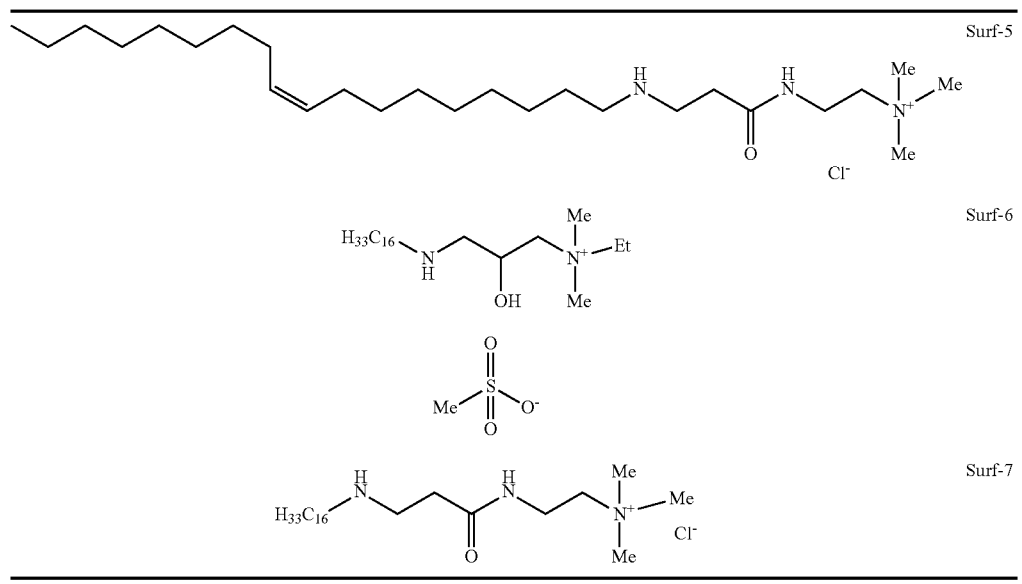

A.3. Core of the Nanocapsule
A.3.1. Thermal Reactive Chemistry

The core of the capsules in the pre-treatment liquid of the invention may comprise one or more chemical reactants including a thermally curable compound. The thermally curable compound is preferably a low molecular, oligomer or polymer compound functionalized with at least one functional group selected from the group consisting of an epoxide, an oxetane, an aziridine, an azetidine, a ketone, an aldehyde, a hydrazide and a blocked isocyanate. In a further preferred embodiment, the thermally curable compound or thermally reactive chemistry is selected from the group consisting of an optionally etherified condensation product of formaldehyde and melamine, an optionally etherified condensation product of formaldehyde and ureum and a phenol formaldehyde resin, preferably a resole.

The thermally reactive chemistry can be a one component or a two component system. A one component system is defined as a reactive system that is capable of forming a polymeric resin or crosslinked network by reacting on its own upon thermal activation. A two component system is defined as a reactive system that is capable of forming a polymeric resin or crosslinked network by reacting with a second component in the system upon thermal activation, also called the thermally reactive crosslinker.

Thermally reactive crosslinkers preferably comprise at least two functional groups selected from the group consisting of an epoxide, an oxetane, an aziridine, an azetidine, a ketone, an aldehyde, a hydrazide and a blocked isocyanate. In a further preferred embodiment, the thermally reactive crosslinker is selected from the group consisting of an optionally etherified condensation product of formaldehyde and melamine, an optionally etherified condensation product of formaldehyde and ureum and a phenol formaldehyde resin, preferably a resole with the proviso that the crosslinker contains at least two thermally reactive groups.

Blocked isocyanates are particularly preferred as thermally reactive crosslinker. Synthesis of blocked isocyanates is well-known to the skilled person and has been reviewed by Wicks D. A. and Wicks Z. W. Jr. (Progress in Organic Coatings, 36, 148-172 (1999)) and Delebecq et al. (Chem; Rev., 113, 80-118 (2013)). Classic blocked isocyanates are defined as chemical components that are capable of forming isocyanates from a precursor upon thermal treatment. In general, the reaction can be summarized as given in scheme 1 below.

Scheme 1

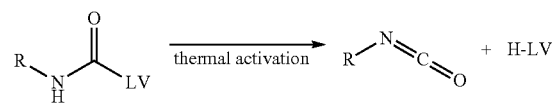

LV represents a leaving group

The activation temperature, also called deblocking temperature, is dependent on the leaving group and is selected dependent on the application. Suitable isocyanate precursors are given below having a variable deblocking temperature between 100° C. and 160° C.

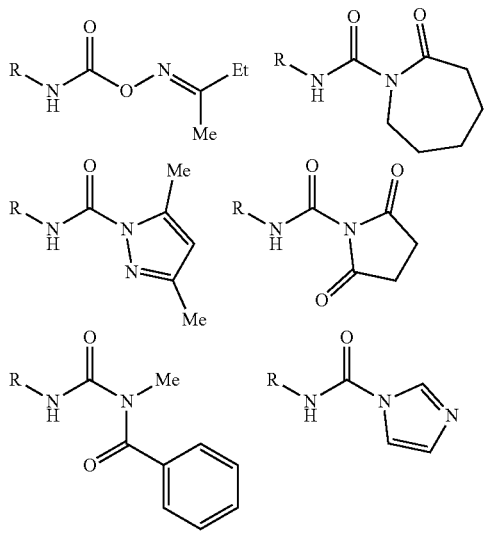

In the above six isocyanate precursors, R represents the residue of a difunctional, multifunctional or polymeric blocked isocyanate. Difunctional and multifunctional blocked isocyanates are preferred. In a further preferred embodiment, R represents a hydrocarbon group, further functionalized with at least one and preferably two or more blocked isocyanates, where the blocked isocyanates can be the same as or different from the first blocked isocyanate listed above. The hydrocarbon group preferably comprises no more then 40 carbon atoms, more preferably no more then 30 carbon atoms and most preferably between 8 and 25 carbon atoms. The same blocked isocyanate functional groups as the first blocked isocyanate are preferred. In a further preferred embodiment R comprises aliphatic, cycloaliphatic or aromatic fragments or combinations thereof. Preferred aliphatic fragments are linear or branched saturated hydrocarbon chains comprising 2 to 12 carbon atoms. Preferred cycloaliphatic fragments are five or six membered saturated hydrocarbon rings, six membered hydrocarbon rings being particularly preferred. Preferred aromatic fragments are selected from the group consisting of phenyl rings and naphtyl rings, phenyl rings being particularly preferred. In a particularly preferred embodiment R comprises at least one fragment selected from the group consisting of a [1,3,5]triazinane-2,4,6-trione fragment and a biuret fragment.

Active methylene compounds as blocking agents are widely used as alternatives for classic blocked isocyanates, operating via an alternative reaction pathway, not yielding an intermediate isocyanate but crosslinking the system via ester formation as disclosed in Progress in Organic Coatings, 36, 148-172 (1999), paragraph 3.8. Suitable examples of active methylene group blocked isocyanates are given below:

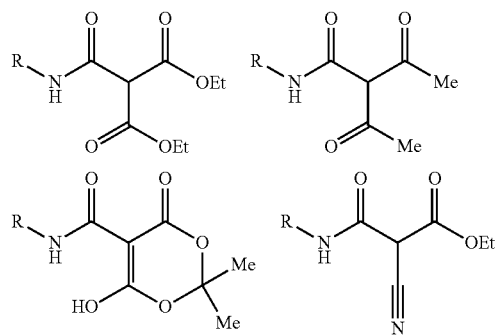

In the above four compounds, R represents the residue of a difunctional, mulfifunctional or polymeric blocked isocyanate or active methylene group blocked isocyanate. Difunctional and multifunctional blocked isocyanates or active methylene group blocked isocyanates are preferred. In a further preferred embodiment, R represents a hydrocarbon group, further functionalized with at least one and preferably two or more blocked isocyanates or active methylene group blocked isocyanates, where the blocked isocyanates can be the same as or different from the first active methylene group blocked isocyanate listed above. The hydrocarbon group preferably comprises no more then 40 carbon atoms, more preferably no more then 30 carbon atoms and most preferably between 8 and 25 carbon atoms. Di- or multifunctional active methylene group blocked isocyanates are preferred, all blocking functional groups being the same being particularly preferred. In a further preferred embodiment R comprises, aliphatic, cycloaliphatic or aromatic fragments or combinations thereof. Preferred aliphatic fragments are linear or branched saturated hydrocarbon chains comprising 2 to 12 carbon atoms. Preferred cycloaliphatic fragments are five or six membered saturated hydrocarbon rings, six membered hydrocarbon rings being particularly preferred. Preferred aromatic fragments are selected from the group consisting of phenyl rings and naphtyl rings, phenyl rings being particularly preferred. In a particularly preferred embodiment R comprises at least one fragment selected from the group consisting of a [1,3,5]triazinane-2,4,6-trione fragment and a biuret fragment.

In a preferred embodiment, the blocked isocyanate is a polyfunctional blocked isocyanate having two to six blocked isocyanate functions. Tri- and tetrafunctional blocked isocyanates are particularly preferred. Preferred blocked isocyanates are precursors capable of forming a di- or multifunctional isocyanate upon thermal activation selected from the group of hexamethylene diisocyanate, isophorone diisocyanate, tolyl diisocyanate, xylylene diisocyanate, a hexamethylene diisocyanate trimer, trimethylhexylene diisocyanate, diphenylmethane diisocyanate, dicyclohexylmethane diisocyanate and condensation products of one or more of the previous isocyanates. Other preferred blocked isocyanates are derivatives from the Takenate™ series of isocyanates (Mitsui), the Duranate™ series (Asahi Kasei Corporation) and the Bayhydur™ series (Bayer AG).

Suitable blocked isocyanates can be selected from the Trixene™ series (Baxenden Chemicals LTD) and the Bayhydur™ series (Bayer AG). Preferred examples of blocked isocyanates are given below in without being limited thereto.

TABLE 2

ISO-1

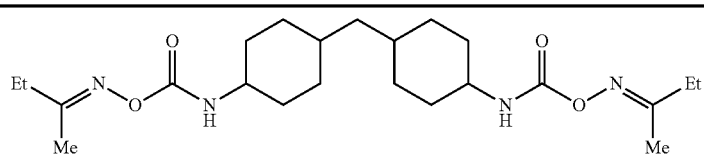

TABLE 2-continued
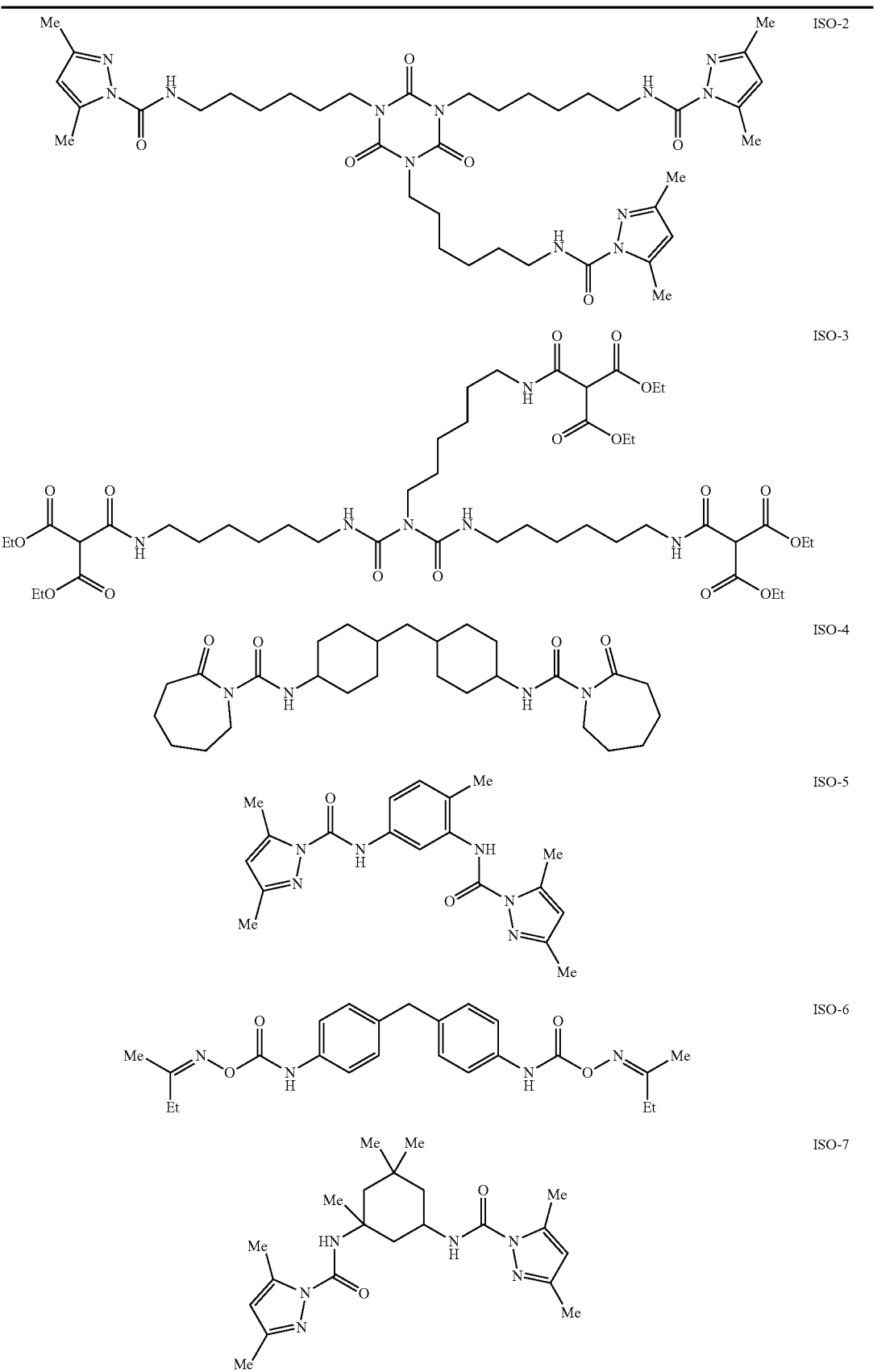

TABLE 2-continued

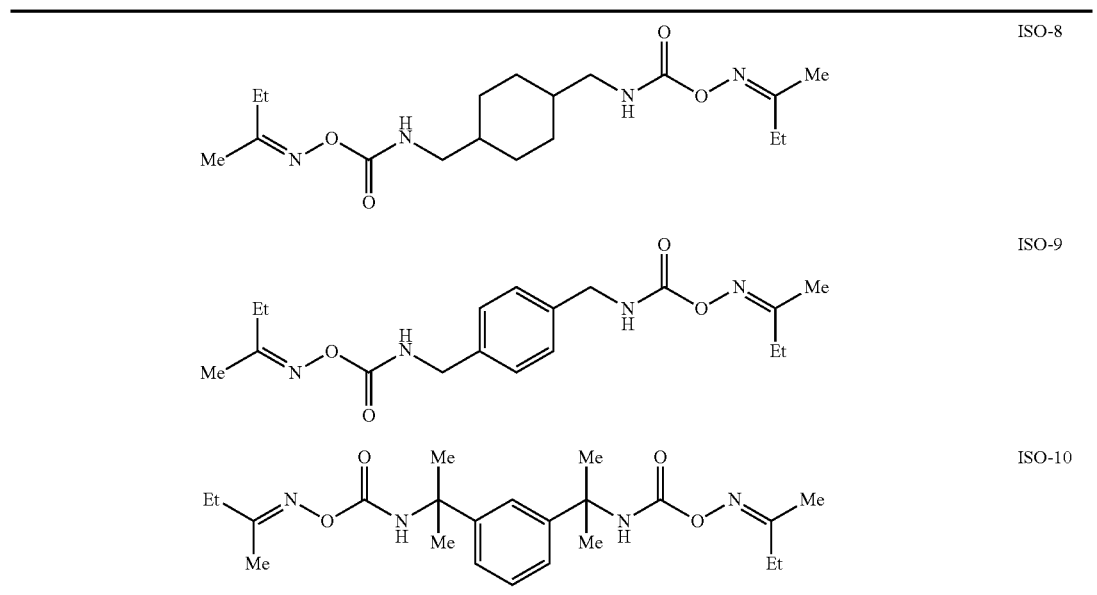

In the more preferred embodiment, said blocked isocyanate is derived from a di-, tri- or tetrafunctional isocyanate terminated oligomer, selected from the group of an isocyanate terminated oligo-ether, an isocyanate terminated oligo-ester, an isocyanate terminated oligocarbonate, an isocyanate terminated butadiene oligomer or hydrogenated butadiene oligomer, an isocyanate terminated isoprene oligomer, an isocyanate terminated silicone oligomer and combinations thereof.

In the most preferred embodiment, said blocked isocyanate has a structure according to General Structure I.

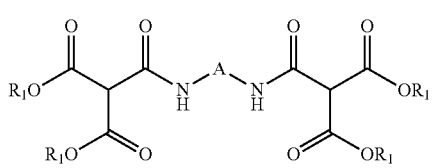

General structure I wherein
$R_1$ is selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group.

A represents a difunctional oligomeric group selected from the group consisting of an oligo-ether, an oligo-ester, an oligo-carbonate, a butadiene oligomer, a hydrogenated butadiene oligomer, an isoprene oligomer, a silicone oligomer and combinations thereof.

In a preferred embodiment said poly-ether oligomers preferably contain 3 to 50 repeating units, more preferably 5 to 40 repeating units and most preferably 6 to 30 repeating units. Said poly-ester based oligomer preferably contains 2 to 20 repeating units, more preferably 3 to 15 repeating units and most preferably 4 to 10 repeating units. Said polysiloxane based oligomer preferably contains 3 to 40 repeating units, more preferably 5 to 30 repeating units and most preferably 6 to 20 repeating units. Said polycarbonate based oligomer preferably contains 3 to 30 repeating units, more preferably 4 to 20 repeating units and most preferably 5 to 15 repeating units. Said polybutadiene, hydrogenated polybutadiene and polyisoprene based oligomers preferably contain 3 to 50 repeating units, 5 to 40 repeating units and most preferably 6 to 30 repeating units. Oligomers containing different oligomeric repeating units preferably contain 60 repeating units or less, more preferably 50 repeating units or lees and most preferably 30 repeating units or less.

In a further embodiment, the dispersion according to the present invention may further comprise a catalyst to activate said thermally reactive chemistry. The catalyst is preferably selected from the group consisting of a Brönsted acid, a Lewis acid and thermal acid generator. Said catalyst can be present in the aqueous continuous phase, in the core of the capsule or in a separate dispersed phase.

A.3.2. Radiation Curable Reactive Chemistry

The reactive chemistry in the core may also be responsive to radiation, such as UV light. UV curable reactive chemistry contains one or more chemical reactants, such as a monomer, oligomer or polymer, which are curable by free radical polymerization or by cationic polymerization. In a preferred embodiment, the monomer, oligomer or polymer includes at least one acrylate group as polymerizable group.

In addition to the monomer, oligomer or polymer that are curable by free radical polymerization or by cationic polymerization in the core of the capsule, water soluble monomers and oligomers may also be included into the aqueous medium of the capsule dispersion.

The inkjet ink preferably includes at least one photoinitiator. Although water soluble or water dispersible photoinitiators may be used in the aqueous medium, preferably the at least one photoinitiator is present in the core of the capsule. Preferably also at least one co-initiator is present in the aqueous medium of the capsule dispersion. Similarly the at least one co-initiator may be present in the aqueous medium, but is preferably present in the core of the capsule.

Any polymerizable compound commonly known in the art may be employed. A combination of monomers, oligomers and/or polymers may be used. The monomers, oligomers and/or polymers may possess different degrees of functionality, and a mixture including combinations of mono-, di-, tri- and higher functionality monomers, oligomers and/or polymers may be used. Particularly preferred curable compounds to be incorporated in the core are disclosed in WO2015/158649 [0072-010].

A.4. Solvent

The capsules according to the invention are dispersed into an aqueous medium which may preferably include one or more water-soluble organic solvents.

The one or more organic solvents may be added for a variety of reasons. For example, it can be advantageous to add a small amount of an organic solvent to improve the dissolution of a compound in the aqueous medium. Preferable water-soluble organic solvents are polyols (e.g., ethylene glycol, glycerin, 2-ethyl-2-(hydroxymethyl)-1,3-propanediol, tetraethylene glycol, triethylene glycol, tripropylene glycol, 1,2,4-butanetriol, diethylene glycol, propylene glycol, dipropylene glycol, butyleneglycol, 1,6-hexanediol, 1,2-hexanediol, 1,5-pentanediol, 1,2-pentanediol, 2,2-dimethyl-1,3-prapanediol, 2-methyl-2,4-pentanediol, 3-methyl-1,5-pentanediol, 3-methyl-1,3-butanediol, and 2-methyl-1,3-propanediol), amines (e.g., ethanolamine, and 2-(dimethylamino)ethanol), monohydric alcohols (e.g., methanol, ethanol, and butanol), alkyl ethers of polyhydric alcohols (e.g., diethylene glycol monomethyl ether, diethylene glycol monobutyl ether, triethylene glycol monomethyl ether, triethylene glycol monobutyl ether, ethylene glycol monomethyl ether, ethylene glycol monobutyl ether, propylene glycol monomethyl ether, propylene glycol monobutyl ether, and dipropylene glycol monomethyl ether), 2,2'thiodiethanol, amides (e.g., N,N-dimethylformamide), heterocycles (e.g., 2-pyrrolidone and N-methyl-2-pyrrolidone), and acetonitrile.

The aqueous medium may contain a humectant to prevent the clogging of nozzles if the liquid containing the capsules is to be applied via jetting. The prevention is due to its ability to slow down the evaporation rate of the pre-treatment liquid, especially the water in the liquid. The humectant is preferably an organic solvent having a higher boiling point than water. Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. A preferred humectant is glycerol.

The humectant is preferably added to the liquid formulation in an amount of 0.1 to 20 wt. % based on the total weight of the liquid.

B. Aqueous Formulations Comprising the Dispersion of Cationic Stabilised Nanocaps.

B.1. Pre-Treatment Liquid for Textile Printing

The dispersion of the invention can further contain additives to come to an aqueous formulation which is suitable as a pre-treatment liquid for treating textile fabrics before printing aqueous colorant containing inks onto this fabric. The nanocapsules are preferably present in the pre-treatment liquid in an amount of no more than 30 wt. %, preferably between 5 and 25 wt. % based on the total weight of the pre-treatment liquid.

Together with the nanocapsules, a multivalent metal ion can be contained in the pre-treatment liquid. Suitable examples are water-soluble metal salts formed from bi- or higher valent metal cations, such as magnesium, calcium, strontium, barium, zirconium, and aluminum, and anions, such as a fluoride ion ($F^-$), a chloride ion ($Cl^-$), a bromide ion ($Br^-$), a sulfate ion ($SO_4^{2-}$, a nitrate ion ($NO_3^-$), and an acetate ion ($CH_3COO^-$).

These polyvalent metal ions have a function of aggregating ink by acting on the carboxyl groups on the surface of the pigment in the ink jet ink, or on the dispersed polymer of nanocapsules contained in the ink. As a result, the ink remains on the surface of the textile fabric to improve the colour-developing property. Therefore, it is preferred that the surface of the pigment in the ink and/or the dispersed polymer of the nanocapsules contained in the ink have a carboxyl group.

The pre-treatment may also contain organic acids. Preferred examples of the organic acids include, but are not limited to, acetic acid, propionic acid, and lactic acid.

The pre-treatment liquid may further contain a resin emulsion. Examples of the resin include, but are not limited to, starches derived from, for instance, maize and wheat; cellulosic materials such as carboxymethyl cellulose and hydroxymethyl cellulose; polysaccharide such as sodium alginate, gum arabic, locust bean gum, trant gum, guar gum, and tamarindus indica seed; proteins such as gelatine and casein; water-soluble naturally occurring polymers such as tannin and lignin; and synthetic water-soluble polymers such as polymers comprising polyvinyl alcohol, polymers comprising polyethylene oxide, polymers formed from acrylic acid monomers, and polymers formed from maleic anhydride monomers. Very suitable resins are acrylic polymers as described in EP2362014 [0027-0030]. The resin content is preferably not more than 20 wt. % relative to the total mass of the pre-treatment liquid (100 mass %).

The pre-treatment liquid may contain a surfactant. Any known surfactant may be used but preferably a glycol surfactant and/or an acetylene alcohol surfactant. The use of the acetylene glycol surfactant and/or the acetylene alcohol surfactant further reduces bleeding to improve printing quality, and also improves the drying property in printing to allow high-speed printing.

The acetylene glycol surfactant and/or the acetylene alcohol surfactant is preferably one or more selected from 2, 4, 7, 9-tetramethyl-5-decine-4, 7-diol, alkylene oxide adducts of 2,4,7,9-tetramethyl-5-decine-4, 7-diol, 2,4-dimethyl-5-decin-4-ol, and alkylene oxide adducts of 2,4-dimethyl-5-decin-4-ol. These are available, for example, from Air Products (GB) as Olfine (registered trademark) 104 series and E series, such as Olfine El 010, or from Nissin Chemical Industry as Surfynol (registered trademark) 465 and Surfynol 61.

The pre-treatment liquid may also contain pigments. Particularly useful for printing on dark textile is a pre-treatment liquid containing a white pigment. The preferred pigment for the aqueous pre-treatment liquid ink is titanium dioxide. Titanium dioxide ($TIO_2$) pigment useful in the present invention may be in the rutile or anatase crystalline form. Processes for making $TiO_2$ are described in greater detail in "The Pigment Handbook", Vol. I, 2nd Ed., John Wiley & Sons, NY (1988), the relevant disclosure of which is incorporated by reference herein for all purposes as if fully setforth.

The titanium dioxide particles can have a wide variety of average particle sizes of about 1 micron or less, depending on the desired end use application of the pre-treatment liquid. For applications demanding high hiding or decorative printing applications, the titanium dioxide particles preferably have an average size of less than about 1 µm. Preferably, the particles have an average size of from about 100 to about 950 nm, more preferably from about 125 to about 750 nm, and still more preferably from about 150 to about 500 nm.

For applications demanding white colour with some degree of transparency, the pigment preference is "nano" titanium dioxide. "Nano" titanium dioxide particles typically have an average size ranging from about 10 to about 200 nm, preferably from about 20 to about 150 nm, and more preferably from about 35 to about 75 nm. An ink comprising nano titanium dioxide can provide improved chroma and transparency, while still retaining good resistance to light fade and appropriate hue angle. A commercially available example of an uncoated nano grade of titanium oxide is P-25, available from Degussa (Parsippany N.J.).

In addition, unique advantages may be realized with multiple particle sizes, such as opaqueness and UV protection. These multiple sizes can be achieved by adding both a pigmentary and a nano grade of $TiO_2$.

The titanium dioxide is preferably incorporated into the pre-treatment formulation via a slurry concentrate composition. The amount of titanium dioxide present in the slurry composition is preferably from about 15 wt. % to about 80 wt. %, based on the total slurry weight.

The titanium dioxide pigment may also bear one or more metal oxide surface coatings. These coatings may be applied using techniques known by those skilled in the art. Examples of metal oxide coatings include silica, alumina, alumina-silica, boria and zirconia, among others. These coatings can provide improved properties including reducing the photo-reactivity of the titanium dioxide. Metal oxide coatings of alumina, aluminasilica, boria and zirconia result in a positive charged surface of the $TiO_2$ pigments and hence are particularly useful in combination with the cationic stabilised capsules of the invention because no additional surface treatment of the pigment is required.

Commercial examples of such coated titanium dioxides include R700 (alumina-coated, available from E.I. DuPont deNemours, Wilmington Del.), RDI-S(alumina-coated, available from Kemira Industrial Chemicals, Helsinki, Finland), R706 (available from DuPont, Wilmington Del.) and W-6042 (a silica alumina treated nano grade titanium dioxide from Tayco Corporation, Osaka Japan).

A biocide may be added to the pre-treatment liquid to prevent unwanted microbial growth, which may occur in the liquid over time. The biocide may be used either singly or in combination. Suitable biocides for the ink-jet ink of the present invention include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxern™ GXL and Proxel™ Ultra 5 available from ARCH UK BIOCIDES and Bronidox™ available from COGNIS.

A biocide is preferably added to the aqueous medium in an amount of 0.001 to 3 wt. %, more preferably 0.01 to 1.0 wt. %, each based on the total weight of the liquid.

The pre-treatment liquid may further comprise at least one thickener for viscosity regulation in the liquid. Suitable thickeners include urea or urea derivatives, hydroxyethylcellulose, carboxymethylcellulose, hydroxypropylcellulose, derived chitin, derived starch, carrageenan, pullulan, proteins, poly(styrenesulphonic acid), poly(styrene-co-maleic anhydride), poly(alkyl vinyl ether-co-maleic anhydride), polyacrylamid, partially hydrolyzed polyacrylamid, poly(acrylic acid), poly(vinyl alcohol), partially hydrolyzed poly(vinyl acetate), poly(hydroxyethyl acrylate), poly(methyl vinyl ether), polyvinylpyrrolidone, poly(2-vinylpyridine), poly(4-vinylpyridine) and poly(diallyldimethylammonium chloride).

The thickener is added preferably in an amount of 0.01 to 20 wt. %, more preferably 0.1 to 10 wt. % based on the liquid.

The pre-treatment liquid may contain at least one pH adjuster. Suitable pH adjusters include organic amines, NaOH, KOH, $NEt_3$, $NH_3$, HCl, $HNO_3$ and $H_2SO_4$. In a preferred embodiment, the pre-treatment liquid has a pH lower than 7. A pH of 7 or less can advantageously influence the electrostatic stabilization of the capsules, especially when the dispersing groups are amines.

The pre-treatment liquid may also contain an optothermal converting agent, which may be any suitable compound absorbing in the wavelength range of emission by a infrared light source. The optothermal converting agent is preferably an infrared dye as this allows easy handling into the inkjet ink. The infrared dye may be included into the aqueous medium, but is preferably included in the core of the capsule. In the latter, the heat transfer is usually much more effective.

Suitable examples of infrared dyes are disclosed in of WO2015158649. The one or more optothermal converting agents are preferably present in the range of 0.1 to 10 wt % based on the total weight of the inkjet ink.

B.2. Inkjet Ink.

The dispersion comprising the nanocaps of the invention is also suitable to be incorporated in aqueous ink jet inks containing a colorant. The nanocapsules are preferably present in the inkjet ink in an amount of no more than 30 wt. %, preferably between 5 and 25 wt. % based on the total weight of the ink. Any colorant may be suitable, but inorganic pigments having a positively charged surface are particularly suitable. Examples of such pigments are white pigments based on $TiO_2$ as described in § B.1. Other suitable inorganic pigments are iron-oxide or chrome-oxide based pigments.

The pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley—VCH, 2004. ISBN 3527305769.

Particularly suitable pigments are dispersed in an aqueous medium using a polymeric dispersant or a cationic surfactant. Also suitable are self-dispersible pigments. The latter prevents interaction of the polymeric dispersant with the dispersing groups of capsules which may be included in the inkjet ink (see below), since dispersion stability of the pigment is accomplished by the same technique of electrostatic stabilization as employed for the capsules.

A self-dispersible pigment is a pigment having on its surface covalently bonded anionic or cationic hydrophilic groups, such as salt-forming groups or the same groups used as dispersing groups for the capsules, that allow the pigment to be dispersed in an aqueous medium without using a surfactant or a resin.

The technology for making self-dispersible pigments is well-known. For example, EP1220879A discloses pigments having attached a) at least one steric group and b) at least one organic ionic group and at least one amphiphilic counterion, wherein the amphiphilic counterion has a charge opposite to that of the organic ionic group that are suitable for inkjet inks.

Also EP906371A discloses suitable surface-modified coloured pigment having attached hydrophilic organic groups containing one or more ionic groups or ionizable groups. Suitable cationic groups as ionic groups are disclosed in WO97/48769, p. 6.

Pigment particles in inkjet inks should be sufficiently small to permit free flow of the ink through the inkjet-printing device, especially at the ejecting nozzles. It is also desirable to use small particles for maximum colour strength and to slow down sedimentation.

The average pigment particle size is preferably between 0.050 and 1 μm, more preferably between 0.070 and 0.300 μm and particularly preferably between 0.080 and 0.200 μm. Most preferably, the numeric average pigment particle size is no larger than 0.150 μm. The average particle size of pigment particles is determined with a Brookhaven Instruments Particle Sizer BI90plus based upon the principle of dynamic light scattering. The ink is diluted with ethyl acetate to a pigment concentration of 0.002 wt %. The measurement settings of the BI90plus are: 5 runs at 23° C., angle of 90°, wavelength of 635 nm and graphics=correction function.

However for white pigment inkjet inks, the numeric average particle diameter of the white pigment is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample can, for example, be prepared by addition of one drop of ink to a cuvette containing 1.5 mL ethyl acetate and mixed until a homogenous sample was obtained. The measured particle size is the average value of 3 consecutive measurements consisting of 6 runs of 20 seconds.

Suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548.

The aqueous inkjet ink may further comprise a surfactant, a humectant, a biocide and a thickener as an additive. These suitable additives are described in § B.1.

C. Inkjet Printing Method

Printing methods using liquids such a pre-treatment liquids for textile printing or aqueous inkjet inks comprising a dispersion of the capsules according to the invention, includes at least the steps of: a) applying the liquid comprising the dispersion of the capsules according to the invention onto a substrate; and b) applying heat and/or light to form a reaction product from the one or more chemical reactants in the capsules.

In the digital textile printing process of the invention, the textile fabric used is made of one type of fibre or blended fibre of two or more selected from the group consisting of cotton, hemp, rayon fibre, acetate fibre, silk, nylon fibre, and polyester fibre. The fabric may be in any form, for example, a woven, knitted, or nonwoven form of the above-mentioned fibres.

In a first step of the digital textile printing method, the pre-treatment liquid containing the nanocapsules according to the invention, can be preferably applied to the fabric by spraying, coating, or pad printing. Alternatively, the pre-treatment liquid may also be applied to fabric using an ink jet head or valve jet head. This last means of applying the pre-treatment liquid has the advantage that the amount of required pre-treatment liquid is substantially lower than with the other application methods. By means of an ink jet head, it is possible to apply the pre-treatment liquid onto areas of the fabric where the image should be printed. When the pre-treatment agent is applied to fabric with an ink jet head, the particle diameter of the nanocapsules and the cationic polymer particles is preferably in the range 50 nm 1 μm when determined by light scattering. A particle diameter larger than 1 μm tends to cause a deterioration in stability of jetting from the ink jet head. The particle diameter is more preferably 500 nm or less. Suitable ink jet head types for applying the pre-treatment liquid are piezoelectric type, continuous type, thermal print head type or valve jet type. Preferable capsules are the one with a core comprising a thermally reactive crosslinker and stabilised with cationic dispersing groups.

Fabric to which the pre-treatment liquid has been applied may be dried and optionally undergo a heat treatment, before the subsequent ink jetting step with colorant containing ink. The heat treatment is preferably at 110 to 200° C., more preferably 130 to 180° C. Heating at 110° C. or higher enables the thermally reactive crosslinker in the core of the nanoparticle to be fixed to the fibres of the fabric. Examples of the heating process include, but are not limited to, heat press, atmospheric steaming, high-pressure steaming, and THERMOFIX. Any heat source can be used for the heating process; for example, an infrared ray lamp is employed.

After the ink jetting step, the printed fabric is dried and heated. If the heating step after the pre-treatment did not occur (see above), the heating step of the printed fabric is required. The drying step can be performed at the air, but the heating step must be performed by using heat sources; examples include equipment for forced-air heating, radiation heating such as IR-radiation, including NIR- and CIR radiation, conduction heating, high-frequency drying, and microwave drying. The drying step of the fabric is carried at a temperature preferably below 150° C., more preferably below 100° C., most preferably below 80° C. The heating step is preferably at 110 to 200° C., more preferably 130 to 160° C.

Another embodiment of the inkjet printing method according to the present invention includes at least the steps of: a) jetting an inkjet ink comprising a colorant and the capsules of the invention onto a substrate; and b) applying heat and/or light to form a reaction product from the one or more chemical reactants in the capsules. Suitable substrates are textile fabrics, leather, glass, ceramic, metallic, glass, wood, paper or polymeric surfaces. The substrate may also be primed, e.g. by a white ink.

The substrate may be porous, as e.g. textile, paper and card board substrates, or substantially non-absorbing substrates such as e.g. a plastic substrate having a polyethylene terephthalate surface.

Preferred substrates including surfaces of polyethylene, polypropylene, polycarbonate, polyvinyl chloride, polyesters like polyethylene terephthalate (PET), polyethylene naphthalate (PEN) and polylactide (PLA) and polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 $g/cm^3$ or more.

A preferred ink jet head for the inkjet printing system is a piezoelectric ink jet head. Piezoelectric inkjet jetting is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the ink jet head. However the jetting of the ink according to the present invention is not restricted to piezoelectric inkjet printing. Other inkjet print heads can be used and include various types, such as a continuous type, a thermal print head type and a valve jet type.

If an optothermal converting agent is present in the nanocapsules of the invention, the heating mains may be a suitable light source. If the optothermal converting agent consists of one or more infrared dyes, an infrared light source is used. Any infrared light source may be used, as long as at least part of the emitted light is suitable for activating the thermally reactive crosslinker. The infrared curing means may include an infrared laser, an infrared laser diode, infrared LEDs or a combination thereof.

EXAMPLES

1. Materials
    Cab-o-Jet 465M is a magenta pigment dispersion supplied by Cabot
    Cab-o-Jet 465C is a cyan pigment dispersion supplied by Cabot.
    Alkanol XC is an anionic surfactant supplied by Dupont.
    Desmodur N75 BA is a trifubctional isocyanate supplied by Bayer AG.
    Trixene BI7963 is a malonate blocked isocyanate supplied by Baxenden Chemiclas LTD).
    Lakeland ACP70 is a zwitterionic surfactant supplied by Lakeland Laboratories LTD.
    Edaplan 482 is a polymeric dispersant supplied by Münzing Chemie GmbH.
    Hostaperm Blau B4G-KR is a PB15:3, supplied by Clariant
    Proxel K is a 5 w % solution in water of Promex Clear, supplied by YDS Chemicals NV
    Tivida FL2500 is a surfactant supplied by Merck.
    Capstone F53100 is a surfactant, supplied by Dupont.
    Tego Twin 4000 is a surfactant, supplied by Evonik Industries.
2. Measuring Methods
2.1. L-Values
    L-values of printed samples were measured using a Gretag SPM50 (Gretag Limited, Switserland).

2.2. Colour Gamut

The a and b-values of inventive and comparative samples and the starting fabric were measured using a Gretag SPM50 (Gretag Limited, Switserland). The Δa and Δb values for each sample were calculated by substracting the a and b-values measured on the starting fabric from the values measured on the printed samples. These values were converted into a AC value using the following formula:

$$\Delta C = \sqrt{\Delta a^2 + \Delta b^2}$$

3. Synthesis of Nanocapsules of the Invention 3.1. The Synthesis of Co-Reactive Cationic Surfactants The Synthesis of Surf-2

29 g (0.105 mol) (3-acrylamidopropyl)trimethylammonium chloride (supplied as 75 W % in water) is dissolved in 150 g isopropanol. 26.9 g (0.1 mol) octadecyl amine and 15 g (0.148 mol) triethyl amine were added and the mixture was heated to 80° C. for 24 hours. The solvent was removed under reduced pressure. Surf-2 was used in nanocapsule syntheses without further purification.

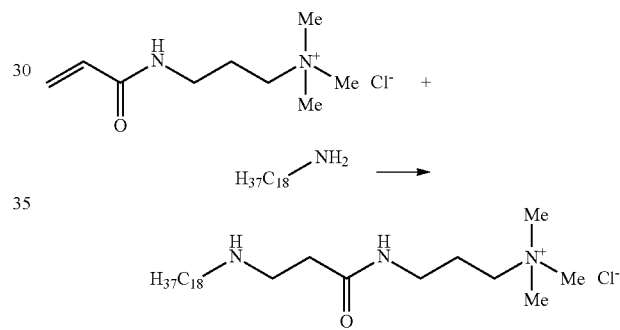

The synthesis of Surf-3

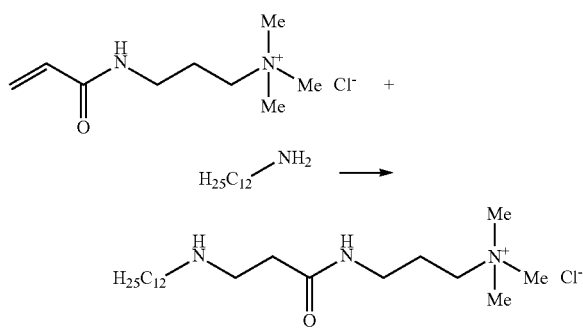

29 g (0.105 mol) (3-acrylamidopropyl)trimethylammonium chloride (supplied as 75 W % in water) is dissolved in 150 g isopropanol. 18.5 g (0.1 mol) dodecyl amine and 15 g (0.148 mol) triethyl amine were added and the mixture was heated to 80° C. for 24 hours. The solvent was removed under reduced pressure. Surf-3 was used in the nanocapsule syntheses as described below, without further purification.

The synthesis of surf-5

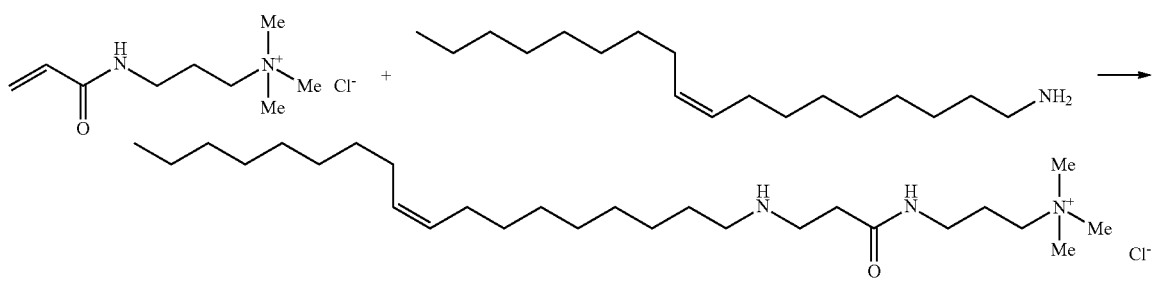

29 g (0.105 mol) (3-acrylamidopropyl)trimethylammonium chloride (supplied as 75 W % in water) is dissolved in 150 g isopropanol. 26.7 g (0.1 mol) oleyl amine and 15 g (0.148 mol) triethyl amine were added and the mixture was heated to 80° C. for 24 hours. The solvent was removed under reduced pressure. Surf-5 was used in nanocapsule syntheses as described below without further purification.

3.2. The Synthesis of an Polypropylene Oxide Based Malonate Blocked Isocyanate ISO-1:

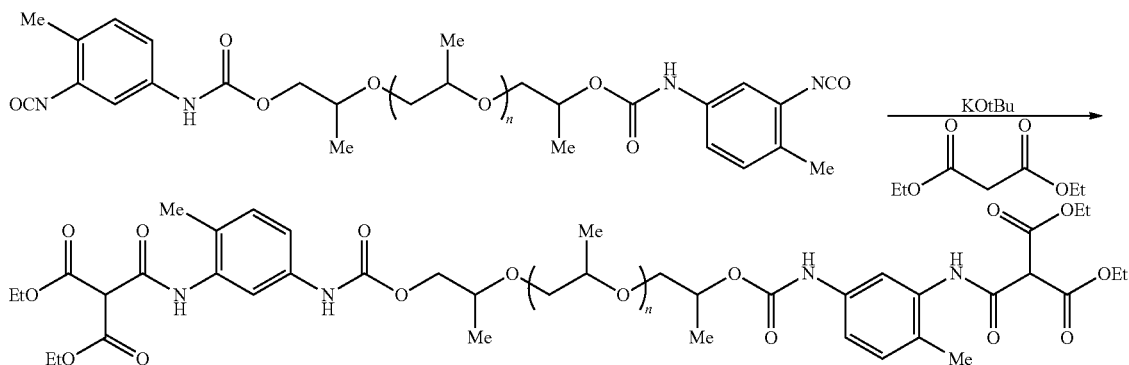

17.6 g (0.11 mol) diethyl malonate was dissolved in 450 ml THF. 12.3 g (0.11 mol) potassium tert. butoxide was added and the mixture was stirred for 30 minutes. Upon addition of the potassium tert. butoxide, the potassium salt of diethyl malonate precipitated from the medium. During the addition, the temperature rose to 40° C. The mixture was cooled to 20° C. and 115 g of TDI terminated poly(propylene oxide) (Mn=2300, NCO-content: 3.6 w %) was added. The reaction was allowed to continue for 16 hours at room temperature. The solvent was evaporated under reduced pressure and 300 ml methylene chloride was added. The methylene chloride solution was added to a solution of 11 g of concentrated hydrochloric acid in 500 ml water. The organic fraction was isolated and 200 ml of tert.butyl methyl ether was added. The organic fraction was extracted three times with 250 ml brine, dried over MgSO4 and evaporated under reduced pressure. 129 g of the malonate endcapped polymer was isolated. The oligomeric blocked isocyanate was used without further purification.

3.3. The Synthesis of Capsules Having a Core Comprising a Thermally Reactive Crosslinker and a Shell Stabilized by Cationic Dispersing Groups.

CATCAPS-1:

A solution of 24 g Desmodur N75 BA and 18 g of the oligomeric blocked isocyanate ISO-1 in 36.5 g ethyl acetate was prepared and this solution was added to a solution of 7 g of the cationic surfactant SURF-5 and 1 g tertaethylene pentamine in 80 ml water while stirring for 5 minutes using an Ultra-Turrax at a rotation speed of 18000 rpm. 85 ml water was added to the dispersion and the ethyl acetate was evaporated at 65° C. under reduced pressure, while gradually increasing the vacuum from 500 mbar to 120 mbar. Upon complete evaporation of the ethyl acetate, an additional 65 ml water was evaporated. The dispersion was stirred for 16 hours at 65° C. The dispersion was allowed to cool down to room temperature. 150 ml water was added and the dispersion was consecutively filtered over a 10 μm and a 5 μm filter. The dispersion was concentrated under reduced pressure to 145 ml.

The average particle size was measured using a Zetasizer™ Nano-S(Malvern Instruments, Goffin Meyvis). The average particle size was 1100 nm.

CATCAPS-2:

A solution of 22 g Desmodur BA and 23 g Trixene BI7963 in 36 g ethyl acetate was prepared and added to a solution of 6.5 g of the cationic surfactant SURF-5 and 30 g glycerol in 55 g water while stirring for 5 minutes using an Ultra-Turrax at a rotation speed of 18000 rpm. 80 g water was added and the ethyl acetate was evaporated at 65° C. under reduced pressure, while gradually increasing the vacuum from 500 mbar to 120 mbar. Upon complete evaporation of the ethyl acetate, an additional 60 ml water was evaporated. Water was added to the dispersion to bring the total weight to 145 g. The dispersion was stirred for 16 hours at 65° C. The dispersion was allowed to cool down to room temperature and consecutively filtered over a 5 μm and a 2.7 μm filter.

The average particle size was measured using a Zetasizer™ Nano-S (Malvern Instruments, Goffin Meyvis). The average particle size was 185 nm.

CATCAPS-3:

A solution of 22 g Desmodur BA and 22 g of the oligomeric blocked isocyanate ISO-1 in 36 g ethyl acetate was prepared and added to a solution of 6.5 g of the cationic surfactant SURF-5 and 30 g glycerol in 55 g water while stirring for 5 minutes using an Ultra-Turrax at a rotation speed of 18000 rpm. 80 g water was added and the ethyl acetate was evaporated at 65° C. under reduced pressure, while gradually increasing the vacuum from 500 mbar to 120 mbar. Upon complete evaporation of the ethyl acetate, an additional 60 ml water was evaporated. Water was added to the dispersion to bring the total weight to 145 g. The dispersion was stirred for 16 hours at 65° C. The dispersion was allowed to cool down to room temperature and consecutively filtered over a 5 μm and a 2.7 μm filter.

The average particle size was measured using a Zetasizer™ Nano-S (Malvern Instruments, Goffin Meyvis). The average particle size was 190 nm.

Example 1

In Ex.1, an image is printed onto a cotton fabric which was pre-treated by means of a pre-treatment liquid containing nanocaps stabilised with cationic dispersing groups.

Formulation of the Pre-Treatment Liquid According to the Invention.

The Pre-Treatment Liquid INKCAT-1:

The pre-treatment liquid INKCAT-1 was prepared by mixing the components according to Table 3. All weight percentages are based on the total weight of the ink jet ink.

TABLE 3

| Wt. % of component | INKCAT-1 |
|---|---|
| CATCAPS-1 | 36.3 |
| 1,2-propane diol | 20.4 |
| glycerol | 20.4 |
| water | 22.9 |

Formulation of the Aqueous Colorant Containing Inkjet Ink: INKANION-1

The Synthesis of the Nanocapsule NANO-1

A solution of 91 g Desmodur N75 BA and 95 g Trixene BI7963 in 151 g ethyl acetate was prepared. This solution was added to a solution of 33.1 g Lakeland ACP70, 8.27 g L-lysine and 3.73 g of a 33 w % solution of sodium hydroxide in 310 g water while stirring for 5 minutes using an Ultra-Turrax at a rotation speed of 18000 rpm. 350 ml water was added and the ethyl acetate was evaporated at 65° C. under reduced pressure, while gradually increasing the vacuum from 500 mbar to 120 mbar. Upon complete evaporation of the ethyl acetate, an additional 250 ml water was evaporated. Water was added to the dispersion to bring it to a total weight of 600 g. The dispersion was stirred for 16 hours at 65° C. The dispersion was allowed to cool down to room temperature.

The average particle size was measured using a Zetasizer™ Nano-S (Malvern Instruments, Goffin Meyvis). The average particle size was 200 nm.

The Aqueous Ink Jet Ink Formulation INKANION-1:

The ink jet ink INKANION-1 was prepared by mixing the components according to Table 4. All weight percentages are based on the total weight of the ink jet ink.

TABLE 4

| Wt % of component | INKANION-1 |
|---|---|
| NANO-1 | 37.75 |
| Cab-o-Jet 465M | 23.5 |
| Alkanol XC | 0.25 |
| Triethyl amine | 0.5 |
| Glycerol | 19 |
| 1,2-propane diol | 19 |

The mixture was stirred for 5 minutes and filtered over a 5 μm filter.

Inventive Printed Sample INV-1:

A solid area was printed by jetting the pre-treatment liquid INKCAT-1 onto an untreated cotton textile, using a Dimatix™ DMP2831 system, equipped with a standard Dimatix™ 10 pl print head. The ink was jetted at 22° C., using a firing frequency of 5 kHz, a firing voltage of 25 V and a standard waveform.

Onto the printed solid area the ink INKANION-1 was jetted using a Dimatix™ DMP2831 system, equipped with a standard Dimatix™ 10 pl print head. The ink was jetted at 22° C., using a firing frequency of 5 kHz, a firing voltage of 25 V and a standard waveform. The sample INV-1 was dried followed by thermal fixation at 160° C. for 5 minutes.

Comparative Printed Sample COMP-1:

A solid area was printed by jetting the ink jet ink INKANION-1 onto an untreated cotton textile, using a Dimatix™ DMP2831 system, equipped with a standard Dimatix™ 10 pl print head. The ink was jetted at 22° C., using a firing frequency of 5 kHz, a firing voltage of 25 V and a standard waveform. The sample COMP-1 was dried, followed by thermal fixation at 160° C. for 5 minutes.

The L-value of both the inventive and the comparative sample are summarized in Table 5.

TABLE 5

|  | L-value |
|---|---|
| Inventive sample INV-1 | 50.28 |
| Comparative sample COMP-1 | 52.55 |

From Table 5, it can be seen that if the cotton fabric is pretreated with the pre-treatment liquid containing the nanocapsules of the invention, a significantly denser image is obtained than with the pre-treatment.

Example 2

In Ex.2, an image is printed onto a cotton fabric which was pre-treated by means of a pre-treatment liquid containing nanocaps stabilised with cationic dispersing groups.

The Pre-Treatment Liquids INKCAT-2 and INKCAT-3:

The pre-treatment liquids INKCAT-2 and INKCAT-3 were prepared by mixing the components according to Table K. All weight percentages are based on the total weight of the liquid.

TABLE 6

| Wt. % of component | INKCAT-2 | INKCAT-3 |
|---|---|---|
| CATCAPS-2 | 45 | — |
| CATCAPS-3 | — | 47.5 |
| 1,2-propane diol | 11.5 | 19 |
| glycerol | 20.5 | 10 |
| water | 23 | 23.5 |

The mixture was stirred for 5 minutes and filtered over a 1.6 μm filter.

The Aqueous Ink Jet Ink Formulation INKANION-2:

The ink INKANION-2 was prepared by mixing the components according to Table 7. All weight percentages are based on the total weight of the ink jet ink.

TABLE 7

| Wt. % of component | INKANION-2 |
|---|---|
| 1,2-hexane diol | 3 |
| glycerol | 20 |
| Poly(ethylene glycol) 200 | 33 |
| DISP-C | 14.67 |
| TIVIDA FL2500 | 0.3 |
| Proxel K | 0.2 |
| Triethanol amine | 0.3 |
| water | 28.53 |

DISP-C is a dispersion obtained as follows: A solution of 124 g Edaplan 482 in 5.176 kg water was loaded into a DYNO-MILL ECM Poly mill (Willy A. Bachoven, Switzerland). A solution of 4.279 kg Edaplan 482 and 160 g Proxel K in 8.261 kg water was prepared in a 60 l vessel. The vessel was coupled to the mill and the solution was circulated over the mill for 5 minutes. 6 kg Hostaperm Blau B4G-KR was added to the solution in the 60 l vessel and the dispersion was stirred for 30 minutes. The predispersion was circulated over the mill at a rate of 8 l per minute. 0.4 mm yttrium stabilized zirconia beads ("high wear resistant zirconia grinding media" from TOSOH Co.) were used as grinding media at a filling degree of 42%. The rotation speed of the mill was 14.7 m/s and the residence time was 42 minutes. The prepared dispersion was diluted with 2.615 kg Edaplan 482 in 3.904 kg water and the mixture was circulated over the mill for 10 minutes. The mixture was further diluted with 9.481 kg water and circulated again over the mill for 5 minutes. The final dispersion was discharged into a 60 l vessel. The dispersion was filtered over a 1 μm filter. The particle size was measured using a Zetasizer™ Nano-S (Malvern Instruments, Goffin Meyvis). The average particle size was 131 nm.

Inventive Printed Samples INV-2 and INV-3:

Two solid areas were printed by jetting the pre-treatment liquid INKCAT-2, using a Dimatix™ DMP2831 system, equipped with a standard Dimatix™ 10 pl print head on an untreated cotton textile. The ink was jetted at 22° C., using a firing frequency of 5 kHz, a firing voltage of 25 V and a standard waveform.

Onto one of the printed solid areas the anionic ink INKANION-2 was jetted using a Dimatix™ DMP2831 system, equipped with a standard Dimatix™ 10 pl print head. The ink was jetted at 22° C., using a firing frequency of 5 kHz, a firing voltage of 25 V and a standard waveform. The sample INV-2 was dried followed by thermal fixation at 160° C. for 5 minutes.

Onto the second solid area the anionic ink INKANION-1 was jetted using a Dimatix™ DMP2831 system, equipped with a standard Dimatix™ 10 pl print head. The ink was jetted at 22° C., using a firing frequency of 5 kHz, a firing voltage of 25 V and a standard waveform. The sample INV-3 was dried followed by thermal fixation at 160° C. for 5 minutes.

Comparative Printed Samples COMP-2, COMP-3:

Solid areas of each of the inks INKANION-2 and INKANION-1 were jetted onto an untreated cotton fabric, using a Dimatix™ DMP2831 system, equipped with a standard Dimatix™ 10 pl print head. The ink was jetted at 22° C., using a firing frequency of 5 kHz, a firing voltage of 25 V and a standard waveform. The samples COMP-2 and COMP-3 were dried, followed by thermal fixation at 160° C. for 5 minutes.

The results of the measurements of the colour gamut are summarized in Table 8.

TABLE 8

|  | ΔC |
|---|---|
| Inventive sample INV-2 | 41.4 |
| Comparative sample COMP-2 | 38.7 |
| Inventive sample INV-3 | 53.1 |
| Comparative sample COMP-3 | 48.3 |

From Table 8, it becomes apparent that images can be obtained with a higher colour gamut if the cotton is pre-treated by means of the pre-treatment liquid containing the nancapsules stabilised with cationic dispersing groups.

Example 3

In Ex.3, an image is printed onto an untreated polyester fabric which was pre-treated by means of a pre-treatment liquid containing nanocaps stabilised with cationic dispersing groups.

The polyester substrate (7048FLBS PTX-PES Decotex, supplied by George Otto Friedrich), before being treated was cleaned using isopropanol and ethyl acetate. The substrate was dried before printing.

Inventive Printed Samples INV-5 and INV-6:

Two solid areas were jetted with the pre-treatment liquid INKCAT-3 onto the cleaned polyester substrate, using a Dimatix™ DMP2831 system, equipped with a standard Dimatix™ 10 pl print head. The ink was jetted at 22° C., using a firing frequency of 5 kHz, a firing voltage of 25 V and a standard waveform.

Onto one of the printed solid areas of the polyester, the ink INKANION-2 ws jetted, using a Dimatix™ DMP2831 system, equipped with a standard Dimatix™ 10 pl print head. The ink was jetted at 22° C., using a firing frequency of 5 kHz, a firing voltage of 25 V and a standard waveform. The sample INV-5 was dried followed by thermal fixation at 160° C. for 5 minutes.

Onto the second solid area the ink INKANION-1 was jetted, using a Dimatix™ DMP2831 system, equipped with a standard Dimatix™ 10 pl print head. The ink was jetted at 22° C., using a firing frequency of 5 kHz, a firing voltage of 25 V and a standard waveform. The sample INV-6 was dried followed by thermal fixation at 160° C. for 5 minutes.

Comparative Printed Samples COMP-5 and COMP-6

Solid areas were jetted with each of the inks INKANION-2 and INKANION-1 onto the cleaned polyester substrate, using a Dimatix™ DMP2831 system, equipped with a standard Dimatix™ 10 pl print head. The ink was jetted at 22° C., using a firing frequency of 5 kHz, a firing voltage of 25 V and a standard waveform. The samples COMP-5 and COMP-6 were dried, followed by thermal fixation at 160° C. for 5 minutes.

The results of the colour gamut measurements are summarized in Table 9.

TABLE 9

| | ΔC |
|---|---|
| Inventive sample INV-5 | 61.0 |
| Comparative sample COMP-5 | 55.0 |
| Inventive sample INV-6 | 64.5 |
| Comparative sample COMP-6 | 62.0 |

From Table 9, it becomes apparent that the pre-treatment of the polyester with the pre-treatment clearly increases the gamut of the prints obtained from the aqueous inks compared to reference samples without the pre-treatment.

The invention claimed is:

1. An aqueous dispersion comprising:
a capsule including a polymeric shell surrounding a core; wherein
the core includes one or more chemical reactants that form a reaction product upon application of heat and/or radiation; and
the polymeric shell includes cationic dispersing groups obtained by reacting a surfactant including at least one primary or secondary amine and a quaternary ammonium group with a compound selected from the group consisting of di- or poly-acid chloride, di- or oligoisocyanates, di- or oligosulfochlorides, di- or oligo-chloroformates, and an isocyanate monomer of the polymeric shell;
wherein the surfactant is represented by Formula I:

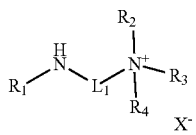

Formula I wherein
R₁ is selected from the group consisting of a substituted or unsubstituted alkyl group, a substituted or unsubstituted alkenyl group, and a substituted or unsubstituted alkynyl group, and R₁ includes at least eight carbon atoms;
R₂, R₃, and R₄ are independently selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted (hetero)aryl group;
L₁ represents a divalent linking group including no more than eight carbon atoms;
X represents a counterion that compensates for a positive charge of the quaternary ammonium group.

2. The aqueous dispersion according to claim 1, wherein the one or more chemical reactants includes a thermally reactive crosslinker.

3. The aqueous dispersion according to claim 2, wherein the thermally reactive crosslinker includes a blocked isocyanate.

4. An aqueous pre-treatment liquid for textile printing, the aqueous pre-treatment liquid comprising:
the aqueous dispersion as defined in claim 3.

5. The aqueous pre-treatment liquid according to claim 4, further comprising a white pigment.

6. An aqueous inkjet ink comprising:
the aqueous dispersion as defined in claim 3; and
a colorant.

7. An aqueous inkjet ink comprising:
the aqueous dispersion as defined in claim 1; and
a colorant.

8. A method for preparing an aqueous dispersion of a capsule, the method comprising the steps of:
preparing a non-aqueous solution of a first shell component for forming a polymeric shell and one or more chemical reactants, optionally in an organic solvent having a low miscibility with water and having a lower boiling point than water;
preparing an aqueous solution of a second shell component for forming the polymeric shell and a surfactant including at least one primary or secondary amine and a quaternary ammonium group;
dispersing the non-aqueous solution under shear in the aqueous solution;
optionally stripping the organic solvent from a mixture of the aqueous solution and the non-aqueous solution; and
preparing the polymeric shell around the one or more chemical reactants by interfacial polymerization of the first shell component and the second shell component and by reaction between the surfactant and the first shell component;
wherein the surfactant is represented by Formula I:

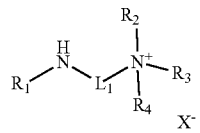

Formula I wherein
R₁ is selected from the group consisting of a substituted or unsubstituted alkyl group, a substituted or unsubstituted alkenyl group, and a substituted or unsubstituted alkynyl group, and R₁ includes at least eight carbon atoms;
R₂, R₃, and R₄ are independently selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted (hetero)aryl group;
L₁ represents a divalent linking group including no more than eight carbon atoms;
X represents a counterion that compensates for a positive charge of the quaternary ammonium group.

* * * * *